United States Patent

[11] 3,590,683

[72] Inventor Kenji Hiruma
  Tokyo, Japan
[21] Appl. No. 827,577
[22] Filed May 26, 1969
[45] Patented July 6, 1971
[73] Assignee Kabushiki Kaisha Ricoh
  Tokyo, Japan
[32] Priority May 30, 1968
[33] Japan
[31] 43/36951

[54] EYE LEVEL AND BREAST LEVEL VIEWING SELECTION FINDER SYSTEM FOR SINGLE LENS REFLEX CAMERA
3 Claims, 2 Drawing Figs.
[52] U.S. Cl. ................................. 88/1.5, 95/42
[51] Int. Cl. .............................. G03b 13/00
[50] Field of Search .......................... 95/42, 44; 88/1.5

[56] References Cited
UNITED STATES PATENTS
2,305,978  12/1942  Melchor .................. 88/1.5
2,845,836  8/1958  Lessler et al. ............ 95/44 X
3,052,169  9/1962  Papke ..................... 95/42
FOREIGN PATENTS
741,844  11/1943  Germany .................. 95/42
983,624  6/1951  France ................... 95/42

Primary Examiner—Ronald L. Wibert
Assistant Examiner—F. L. Evans
Attorney—Burgess, Ryan and Hicks ABSTRACT: A finder system for single-lens reflex camera which can be arbitrarily switched from an eye-level to a breast-level or vice versa by extending a plane reflecting mirror into or retracting from the optical path in a pentaroof-type reflecting mirror of a finder optical system. Since the pentaroof-type reflecting mirror is used, said plane mirror for optical path changeover may be freely moved within the reflecting mirror. The finder of the present invention is more simple in construction and more compact in size as compared with a finder system incorporating a pentaroof-type prism.

PATENTED JUL 6 1971 3,590,683

INVENTOR
KENJI HIRUMA
BY Burgess, Ryan + Hicks
ATTORNEYS

EYE LEVEL AND BREAST LEVEL VIEWING SELECTION FINDER SYSTEM FOR SINGLE LENS REFLEX CAMERA

BACKGROUND OF THE INVENTION

The present invention relates to a finder system for a single-lens reflex camera and more particularly to a finder system for a single-lens reflex camera which can be arbitrarily switched from an eye-level to a breast-level viewing or vice versa by extending a plane reflecting mirror into or retracting it from the optical path of a pentaroof-type reflecting mirror.

In some high-class single-lens reflex cameras, interchangeable finder systems including a pentaprism are provided so that by selecting a suitable finder, eye-level or breast-level viewing may be selectively made. However, in such finder systems, the dust or the like tends to find its way into the finder system or the finder system itself tends to be broken when interchanged. Furthermore, such finder system is not preferable for a camera of the type in which a light element (generally photoelectric cell) is located in the optical path within the finder system. A breast-level viewing attachment to be mounted to an eye-level finder is also available. However, the brightness of the image and the angle of view are limited and the attachment and detachment of such attachment accessory for every photograph is tedious.

It is therefore preferable to provide a finder which can be selectively switched between the eye-level and breast-level viewing without any attachment and without detaching any optical element within the finder system and which can minimize the increase of the bulk of the finder system.

However, in case of the finder system incorporating a pentaroof-type prism, the switching or selection system of the type described above must be disposed outside of the prism so that the dimensions of the camera become inevitably large and the system itself becomes complicated in construction. Various attempts have been made for eliminating such defects, but so far no satisfactory system has been proposed.

The primary object of the present invention is therefore to provide a finder system for a single-lens reflex camera which can be switched between the eye-level and waist-level viewing and is simple in construction and compact in size.

SUMMARY OF THE INVENTION

To accomplish the above described object, the present invention provides a finder system for a single-lens reflex camera capable of switching between the eye-level and waist-level viewing in which a plane reflecting mirror is extended into or retracted from the optical path within a pentaroof-type reflecting mirror of the finder optical system in such a manner that when said plane reflecting mirror is extended into the pentaroof-type reflecting mirror the light which otherwise is directed toward the eye-level eyepiece is reflected toward the breast-level eyepiece.

According to one embodiment of the present invention, said plane reflecting mirror for optical path changeover is extended into and retracted from the pentaroof-type reflecting mirror by rotation of a lever carrying said plane reflecting mirror. When the plane reflecting mirror is extended into the pentaroof-type reflecting mirror, the finder may be used for breast-level viewing while the plane reflecting mirror is retracted, the finder may be used for eye-level viewing.

According to another embodiment of the present invention, the plane reflecting mirror is adapted to rotate about an axis, for example one side edge thereof, so that when the plane reflecting mirror is inclined into the pentaroof-type reflecting mirror, the finder system may be used for breast-level viewing while the plane reflecting mirror is retracted the finder system, for eye-level viewing.

According to a further embodiment of the present invention, the breast-level eyepiece is mounted by a member provided separately from the pentaroof-type reflecting mirror.

In a still further embodiment of the present invention, the breast-level eyepiece may be attached to the pentaroof-type reflecting mirror.

The above and other objects, features and advantages of the present invention will become more apparent from the following description taken in conjunction with the accompanying drawings.

DESCRIPTION OF THE PREFERRED EMBODIMENTS

Figures 1, 2:
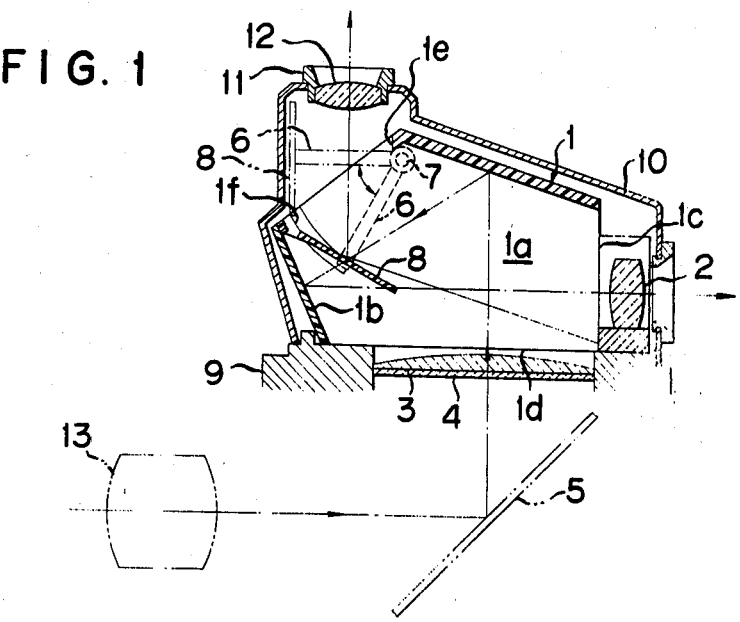
FIGS. 1 and 2 are longitudinal sectional views showing first and second embodiments of the present invention respectively.

Referring to FIG. 1, a pentaroof-type reflecting mirror generally designated by a reference numeral 1 is hollow body fabricated for example by molding a plastic material and has the similar configuration to that of the ordinary pentaprism. The reflecting mirror 1 includes roof-type reflecting surfaces 1a (only one of the two surfaces being shown), a final reflecting surface 1b consisting of a plane reflecting mirror attached to the reflecting mirror body, a light entrance 1d and a light emerging opening 1c.

An eye-level eyepiece 2 is disposed adjacent to the light emerging opening 1c of the pentaroof-type reflecting mirror 1. A condenser lens 3 and a focusing plate 4 are disposed downwardly of the light entrance 1d. Below the focusing plate 4 is disposed a movable reflecting mirror 5 having a well known construction. In the wall above and adjacent to the final reflecting surface 1b is formed an opening 1e and a slot 1f is formed in one sidewall adjacent to the opening 1e. A reflecting mirror carrying lever 6 has its one end rotatably fixed to a pivot 7 which in turn is fixed to a stationary member of the camera outside of the pentaroof-type reflecting mirror 1. A plane reflecting mirror 8 is fixed to the other end of the lever 6. This lever is pivotal to extend through the slot 1f into the exterior of the reflecting mirror 1 in such a manner that the plane reflecting mirror 8 may rotate within and without the pentaroof-type reflecting mirror 1. Thus, the plane reflecting mirror 8 may be positioned at a position where the light is reflected by a plane mirror 8 toward the breast-level eyepiece 12 (this position being shown by the solid line) or a retracted position (shown by the dash-dotted line), when the lever 6 is operated from the exterior of the pentaroof-type reflecting mirror 1. An upper cover 10 mounted upon a camera body 9 is provided with an eyepiece supporting frame 11 formed upwardly of the opening 1e. The frame 11 holds in position the breast-level eyepiece 12. When the plane reflecting mirror 8 is at its retracted position, the light reflected by the movable reflecting mirror 5 is directed toward the eye-level eyepiece 2 through the roof-type reflecting surfaces 1a and the reflecting surface 1b. When the plane reflecting mirror 8 is extended, the light reflected by the roof-type reflecting surfaces 1a is further reflected by the plane reflecting mirror 8 and is directed toward the breast-level eyepiece 12. Reference numeral 13 denotes a photo lens.

From the foregoing, it will be seen that the eye-level or breast-level receiving photography may be arbitrarily selected by extending the plane reflecting mirror to its reflecting position or retracing this mirror. As compared with the conventional pentaprism finder device, only the breast-level eyepiece 12 slightly extends outwardly, but will not adversely affect the exterior appearance. Furthermore, the construction is simple. The wall of the pentaroof-type reflecting mirror 1 through which is formed the opening 1e is not used in the finder optical system so that the provision of this opening 1e will not affect the function of the finder.

In the first embodiment, the breast-level eyepiece 12 has been shown as being mounted in the cover 10, but the eyepiece may be supported in the wall extended from the opening 1e. Alternatively, an eyepiece bracket may be secured to the camera body 9 for holding the eyepiece 12.

Next referring to FIG. 2, a second embodiment of the present invention will be described hereinafter. A pentaroof-type reflecting mirror generally designated by a reference numeral 20 has the similar construction as that shown in FIG. 1 and includes roof-type reflecting surfaces 20a (only one of the two surfaces being shown), a final reflecting surface 20b, a light emerging opening and a light entrance. The finder system is provided by an eye-level eyepiece 21 disposed adjacent to the light emerging opening, a condenser lens 22 and a focusing plate 23 disposed downwardly of the light entrance 20d, a movable reflecting mirror 24 disposed downwardly of the focusing plate 23 and the above described pentaroof-type reflecting mirror 20. The above described construction is similar to that of the first embodiment with the exception to be described hereinafter as a novel feature of the present invention.

A lens barrel portion 20e extending upwardly from the wall above the final reflecting surface 20b of the pentaroof-type reflecting mirror is formed integral with the reflecting mirror 20. At the upper end of this lens barrel portion 20e is disposed a breast-level eyepiece 25. One side edge of a plane reflecting mirror frame 27 carrying a plane reflecting mirror 26 is securely fixed to a shaft 28 which in turn is rotatably carried by the stationary members of the camera. By actuating means not shown, the shaft 28 is rotated so that the plane mirror 26 may be selectively located at either of a retracted nonreflecting position (shown by the solid line) or a reflecting position (shown by the dash-dotted line).

When the plane mirror 26 is at its retracted solid line position, it closes light-tightly a lower opening and 20ca of the lens barrel portion 20c so that no exterior light is permitted to enter the pentaroof-type reflecting mirror 20 through the breast-level eyepiece 25 and the lens barrel portion 20c. The light reflected by the rotary reflecting mirror 24 is directed toward the eye-level eyepiece 21 through the focusing plate 23, the roof-type reflecting surfaces 20a and the final reflecting surface 20b. On the other hand, when the plane mirror 26 is extended to its dash-dotted position, the light is reflected by the roof-type reflecting surfaces 20a and the plane mirror 26 toward the waist-level eyepiece 25.

When the finder is used at eye-level, the field viewed through the eye-level eyepiece 25 will not be adversely affected by the light from the exterior so that a subject can be focused accurately with a clear viewing field.

In summary, the present invention is such that a pentarooftype reflecting mirror is provided, said mirror including a light entrance, a light emerging opening, roof-type reflecting surfaces and a final reflecting surface; an eye-level eyepiece is disposed adjacent to the light emerging opening of said reflecting mirror while a breast-level eyepiece is disposed upwardly of the final reflecting surface; and a plane reflecting mirror is so disposed as to be extended into a reflecting position or to be retracted out of the optical path by the operation from the exterior of the camera, whereby the light is directed toward the eye-level eyepiece when the plane mirror is at its retracted position while the light is directed toward the breast-level eyepiece when the plane mirror is at its reflecting position. Thus, without damaging or deteriorating the finder optical system or without the use of a special attachment, the viewing may be easily selected through the eye-level finder or the breast-level finder. Furthermore, the increase in volume of the finder can be minimized without any adverse influence upon the exterior appearance of the finder, thus facilitating the operation. In the second embodiment of the present invention, the light from the exterior through the breast-level eyepiece can be effectively shielded when the eye-level finder is used, thus facilitating more accurate focusing.

I claim:

1. A finder system for a single lens reflex camera comprising:
   a hollow pentatype-roof reflecting mirror mounted within a housing of the camera and including a light entrance and a first light emerging opening;
   an eye-level eyepiece disposed adjacent said first light emerging opening;
   a first angularly positioned plane reflecting surface located within said hollow reflecting mirror and disposed opposite said light entrance;
   a second angularly positioned plane reflecting surface located within said hollow reflecting mirror and disposed adjacent said light entrance to reflect light from said first reflecting surface toward said eye-level eyepiece;
   a second light emerging opening located in said hollow reflecting mirror between said first and second reflecting surfaces;
   a frame portion integral with said housing and extending outwardly from said second light emerging opening;
   a waist-level eyepiece disposed within said frame portion adjacent said second light emerging opening;
   a lever having a plane reflecting mirror attached thereto, said lever pivotally mounted on said camera adjacent to said second light emerging opening;
   said lever being pivotal to a first position wherein said lever reflecting mirror extends into said frame portion allowing light entering said light entrance to be reflected into said eye-level eyepiece; and
   said lever being pivotal to a second position wherein said lever reflecting mirror extends between said first and second reflecting surfaces allowing light entering said light entrance to be reflected into said waist-level eyepiece.

2. A finder system according to claim 1, in which said lever reflecting mirror is attached transversely to a free end of said lever whereby in said first position said lever reflecting mirror and part of said lever extend into said frame portion.

3. A finder system according to claim 1, in which said lever is formed as a receiving frame in which said lever reflecting mirror is mounted in flush relation whereby in said first position said lever and flush reflecting mirror substantially close said second light emerging opening.